United States Patent
Rehrig

(10) Patent No.: US 7,211,766 B2
(45) Date of Patent: May 1, 2007

(54) POWER CABLE FOR AIR COOLED WELDING TORCHES

(76) Inventor: Richard B. Rehrig, 500 S. Andreasen Dr., Escondido, CA (US) 92029

( * ) Notice: Subject to any disclaimer, the term of this patent is extended or adjusted under 35 U.S.C. 154(b) by 0 days.

(21) Appl. No.: 11/220,063

(22) Filed: Sep. 6, 2005

(65) Prior Publication Data

US 2007/0051715 A1  Mar. 8, 2007

(51) Int. Cl.
*B23K 9/32* (2006.01)
*H01B 7/42* (2006.01)

(52) U.S. Cl. ............ 219/137.9; 174/15.6; 174/15.7; 174/47

(58) Field of Classification Search ............ 219/137.9, 219/137.51; 174/15.6, 15.7, 47
See application file for complete search history.

(56) References Cited

U.S. PATENT DOCUMENTS

| | | | | |
|---|---|---|---|---|
| 3,048,078 A | * | 8/1962 | Kaplan et al. ............ | 87/1 |
| 3,966,238 A | * | 6/1976 | Washkewicz et al. ....... | 285/239 |
| 4,310,718 A | * | 1/1982 | Eng ........................ | 174/15.7 |
| 4,824,723 A | * | 4/1989 | Campbell et al. ........... | 428/332 |
| 5,045,665 A | * | 9/1991 | Sarkissian ................. | 219/75 |
| 7,081,586 B2 | * | 7/2006 | Rehrig ..................... | 174/15.1 |

FOREIGN PATENT DOCUMENTS

FR  2 633 437 A1 * 12/1989

* cited by examiner

*Primary Examiner*—Kevin P. Kerns
(74) *Attorney, Agent, or Firm*—Holland & Knight LLP; Richard E. Lyon, Jr.

(57) ABSTRACT

A power cable for use with welding apparatus for conveying power and cooling fluid from a welding machine to a welding torch. The cable includes an outer flexible conduit disposed about a flexible electrical conductor, a pair of end fittings operatively connected to the ends of the conduit and an electrical conductor for securing the power cable between the welding torch and welding machine in fluid and electrical communication therewith. The flexible conduit includes an inner tube portion formed of a flexible non-conductive rubber compound, a protective cover layer comprised of a plurality of threads braided or woven about the inner tube portion and a thin coating of a heat and wear resistant material such as polyurethane disposed over the braided or woven threads for bonding the protective cover layer to the inner tube portion, rendering the power cable heat and wear resistant without adversely affecting the flexibility thereof.

14 Claims, 1 Drawing Sheet

POWER CABLE FOR AIR COOLED WELDING TORCHES

BACKGROUND OF THE INVENTION

Welding torches used in TIG (tungsten inert gas) and GTAW (gas tungsten arc welding) are of two general types: air or gas cooled; and water cooled. The air or gas cooled welding torches are generally employed in lighter duty applications and are cooled solely by dissipating the heat buildup in the torch to the surrounding air. A slight cooling effect is provided by the shielding gas passing through the torch and as a result, such torches are sometimes referred to as gas cooled torches. Water cooled models are used for heavier duty welding applications where the heat buildup in the torch is removed by circulating cooling water through the torch head and service lines.

In both water and air cooled torch assemblies, the line that conveys the electrical output from the power source or welding machine to the torch head is referred to as the power cable. In water cooled torches, the power cable also conveys the cooling water from the torch head back to a circulator reservoir. In air cooled torch assemblies, the power cable also provides a dual function. Instead of conveying cooling water back to the circulator reservoir, the power cable conveys an inert shielding gas, such as argon, to the torch head about the conductor which is generally formed of a stranded copper cable. The cable is attached to metallic connectors made of copper or brass that are attached to the ends of the outer hose or tube. The connectors are typically threaded for threadably engaging the welding torch head at one end and the welding machine at the other end so as to conduct the output power of the welding machine to the welding torch head. The cable connectors also have an aperture therein so as to allow for the passage of the inert shielding gas therethrough and into the hose or tube about the cable such that the gas can pass therethrough to the torch head. The copper cable is smaller in diameter than the bore of the outer tube or hose so that the gas can pass alongside the copper cable.

Several years ago, the outer hose or tube portions of these power cables were made from extruded plastic materials, typically polyvinylchloride (PVC). They were light in weight and flexible but were short lived due to the harsh environment of a welding shop. The heat buildup from the copper cable during use caused the tube to soften and the pressure of the shielding gas passing within the tube would often balloon and burst the tube. The plastic tube was also easily damaged by contact with sparks or other hot materials around the welding site. The plastic tubes also were easily cut by any sharp edges of the materials being welded and in cold weather, they were stiff and hard. Plastic tubes also tended to stiffen with age. As a result of these shortcomings, the industry turned to the use of rubber hoses for their increased durability.

This next generation of power cable typically comprise an inner extruded rubber tube, a layer of fabric reinforcement disposed about the inner tube and an outer layer of rubber covering. The three elements were bonded together to form a hose assembly which was very durable and resistant to high pressures. Such hoses were also cost effective and as a result, replaced the PVC tube power cables. This hose construction, however, rendered the power cable relatively stiff and heavy. The stiffness significantly reduced the bend radius of the power cable and since the TIG welding process is a very articulate process requiring precision torch movement by the welder, these heavy, stiff power cables made the welder's job more difficult and tiring.

In an attempt to regain the flexibility of the earlier cables while retaining reasonable durability, a new power cable configuration which was developed which comprised an extruded rubber inner tube and a braided fabric cover. The inner rubber tube portion of the cable was soft, flexible and light in weight and the outer braid, usually of nylon, provided strength against ballooning and some abrasion resistance. However, during the welding process, the power cable and other lines are continually dragged about the shop floor and are subjected to sparks, hot metals and sharp edges. The outer fabric braided covers on the power cables proved to provide inadequate abrasion resistance. This problem was particularly acute with the power cables used with air or gas cooled welding torches as the power cable is not protected. In water cooled welding systems, three or more lines connect the torch to the power supply and three lines are generally bundled together within an elongated protective cover. The power cables in air and gas cooled systems are not covered and are unprotected during use. It would be highly desirable to provide a new power cable construction for air and gas cooled welding torches which maintained the lightweight and flexibility of the existing cables but which also provided the abrasion resistance and overall durability of earlier rubber hose power cables. The improved power cable of the present invention achieves this result.

SUMMARY OF THE INVENTION

Briefly, the present invention comprises an improved power cable construction particularly adapted for TIG (GTAW) welding torches of the air or gas cooled type which is light in weight, flexible and very durable. The improved power cable has an outer conduit comprised of an inner tube portion extruded from a soft flexible non-conductive rubber compound which is light in weight, extremely flexible, resists stiffening in cold weather and does not harden with age. To enhance the burst strength of the inner tube portion, a tightly braided or woven layer of protective fibrous threads are disposed about the outer surface of the inner tube portion. A rubber cement or other suitable adhesive is preferably employed to hold the threads in place. A thin outer coating of polyurethane or similar material is applied over the braided or woven layer to bond all layers of the power cable together and provide a durable heat and abrasion resistant cover for the power cable without impairing the flexibility or noticeably increasing the weight of the cable.

The principal object of the present invention is to provide an improved power cable for welding torches that is highly flexible, light in weight and heat and abrasion resistant. This and other objects and advantages of the present invention will become readily apparent from the following detailed description, taken in conjunction with the accompanying drawings.

DETAILED DESCRIPTION OF THE PREFERRED EMBODIMENT

Figure 1:
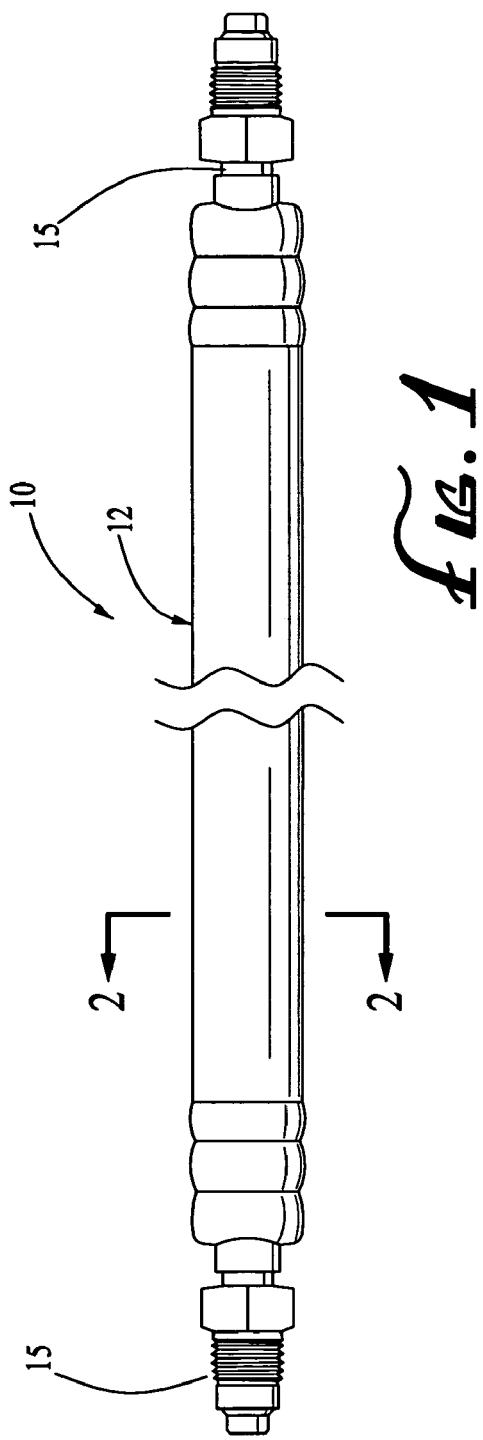
FIG. 1 is a side view of the power cable of the present invention.
Figure 2:
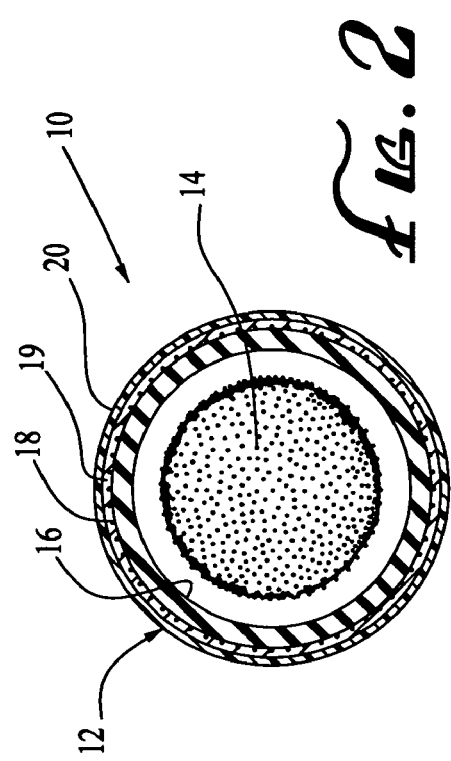
FIG. 2 is an enlarged sectional view taken along the line 2—2 of FIG. 1.

Referring now in detail to the drawings, the power cable 10 of the present invention comprises an outer conduit 12 disposed about an electrically conductive cable 14 formed of a plurality of bare or plated copper wires tightly wound into a ropelike pattern. In its preferred embodiment, the power cable 10 is configured for use with gas or air cooled welding torches. Conventional end fittings 15 for such applications (not shown), which are constructed of an electrically conductive material such as copper or brass, are provided on the opposed ends of the power cable for securing one end of the cable to a welding torch and the other end of the cable to the adapter on a welding machine. The electrically conductive cable 14 extends along the interior of the outer hose portion 12 and is physically and electrically coupled at its extended ends to the end fittings as in a conventional power cable.

The outer conduit 12 of power cable 10 comprises an inner tube portion 16, a braided or woven layer of protective threads 18 and an outer coating 20. The inner tube 16 is extruded from a soft flexible non-conductive rubber compound such as latex which is very lightweight, extremely flexible, does not stiffen in cold weather and does not harden with age. Other rubber compounds having these properties could also be utilized. Preferably, no carbon black has been added to the material of which inner tube portion 16 is formed. Carbon black, while a common ingredient in rubber tubing, is electrically conductive and could bleed current from the conductive cable 14 within conduit 12.

The inner tube portion 16 of the conduit 12 is covered with a protective layer 18 of tightly braided or woven threads to provide the inner tube portion of the conduit with substantial burst strength and eliminate ballooning and bursting of the inner tube portion which could otherwise be caused by the pressure of the shielding gas passing therethrough. The threads comprising layer 18 should be low in cost and could be formed of a wide variety of materials such as nylon, rayon, polyester and cotton fibers. Preferably the threads are glued to the outer surface of the inner tube portion 16 by a rubber cement or other suitable elastic adhesive 19 to hold the protective cover in place without adversely affecting the flexibility of the conduit.

A thin outer coating 20 of polyurethane or similar material is applied over the braided fabric cover 18 to enhance the bonding of the protective cover layer 18 to the inner tube portion 16 and render the composite conduit 12 heat resistant and extremely resistant to abrasion. The outer coating 20 can be applied by spraying, brushing, rolling or dipping and is very thin as compared to the extruded inner tube portion 16 of the conduit. It should be noted that the coating 20 could be applied to the threads comprising the braided or woven layer 18 and cured before the threads are braided or woven about the inner tube. While coating 20 could be formed of a Teflon® material, vinyl, rubber polymers or other suitable materials, polyurethane provides an outer surface for the power cable 10 which is economical and highly resistant to abrasion.

Various other changes and modifications may be made in carrying out the present invention without departing from the spirit and scope thereof. Insofar as such changes and modifications are within the purview of the appended claims, they are to be considered as part of the present invention.

I claim:

1. A power cable for conveying power and cooling fluid from a welding machine to a welding torch, said power cable comprising: an outer flexible conduit; a flexible electrical conductor formed of a plurality of twisted, braided or bunched wires disposed within and spaced from the conduit; and a pair of end fittings for securing the power cable between a welding torch and a welding machine in fluid and electrical communication therewith, and wherein said outer flexible conduit comprises an inner tube portion formed of a flexible non-conductive rubber compound, a protective cover layer comprised of a plurality of threads braided or woven about said inner tube portion, and a thin coating of a heat and wear resistant material disposed over the braided or woven threads for bonding the protective cover layer to said inner tube portion and rendering said power cable heat and wear resistant without adversely affecting its flexibility.

2. The power cable of claim 1 wherein said thin coating is comprised of polyurethane.

3. The power cable of claim 1 wherein said protective cover layer is secured to and about said inner tube by an elastic adhesive material.

4. The power cable of claim 1 wherein said threads are comprised of nylon.

5. The power cable of claim 1 wherein said threads are comprised of rayon.

6. The power cable of claim 1 wherein said threads are comprised of cotton fibers.

7. The power cable of claim 1 wherein said threads are comprised of polyester fibers.

8. The power cable of claim 2 wherein said outer coating of polyurethane is sprayed onto said braided or woven cover layer.

9. The power cable of claim 2 wherein said outer coating of polyurethane is brushed onto said braided or woven cover layer.

10. The power cable of claim 2 wherein said outer coating of polyurethane is rolled onto said braided or woven cover layer.

11. The power cable of claim 2 wherein said outer coating of polyurethane is applied to said braided or woven cover layer by dipping said inner tube portion with said cover layer thereon into a supply of polyurethane.

12. The power cable of claim 2 wherein said outer coating of polyurethane has a thickness substantially less than a transverse dimension defined by said inner tube portion of said conduit.

13. A power cable for conveying power and cooling fluid from a welding machine to a welding torch, said power cable comprising: an outer flexible conduit; a flexible electrical conductor formed of a plurality of twisted, braided or bunched wires disposed within and spaced from the conduit; and a pair of end fittings for securing the power cable between a welding torch and a welding machine in fluid and electrical communication therewith, and wherein said outer flexible conduit comprises an inner tube portion formed of a flexible non-conductive rubber compound, a protective cover layer comprised of a plurality of nylon, rayon, cotton or polyester threads braided or woven about said inner tube portion, and a thin coating of a heat and wear resistant polyurethane material disposed over the braided or woven threads for bonding the protective cover layer to said inner tube portion and rendering said power cable heat and wear resistant without adversely affecting its flexibility.

14. The power cable of claim 13 wherein said protective cover layer is secured to and about said inner tube by an elastic adhesive material.

* * * * *